United States Patent
Weyant (10) Patent No.: US 6,824,066 B2
(45) Date of Patent: Nov. 30, 2004

(54) ELECTRONIC ACCESS SECURITY KEY CARD PAMPHLET

(76) Inventor: Leon H. Weyant, 3090 E. Gause Blvd. #433, Slidell, LA (US) 70461

( * ) Notice: Subject to any disclaimer, the term of this patent is extended or adjusted under 35 U.S.C. 154(b) by 194 days.

(21) Appl. No.: 09/970,582

(22) Filed: Oct. 4, 2001

(65) Prior Publication Data

US 2002/0040935 A1 Apr. 11, 2002

Related U.S. Application Data (60) Provisional application No. 60/238,796, filed on Oct. 6, 2000.

(51) Int. Cl.[7] .............................................. G06K 19/06
(52) U.S. Cl. ...................... 235/493; 235/487; 235/492
(58) Field of Search .............................. 235/493, 492, 235/487

(56) References Cited

U.S. PATENT DOCUMENTS

| | | | |
|---|---|---|---|
| 4,157,534 A | | 6/1979 | Schachter |
| 4,708,369 A | | 11/1987 | Greig |
| 4,837,822 A | * | 6/1989 | Crosley et al. ............. 713/185 |
| 4,849,617 A | * | 7/1989 | Ueda ........................... 235/492 |
| 5,046,343 A | | 9/1991 | Miwa |
| 5,089,692 A | * | 2/1992 | Tonnesson ............... 235/382.5 |
| 5,204,663 A | | 4/1993 | Lee |
| 5,373,149 A | * | 12/1994 | Rasmussen ................. 235/492 |
| 5,477,041 A | | 12/1995 | Miron et al. |
| 5,506,395 A | | 4/1996 | Eppley |
| 5,710,421 A | * | 1/1998 | Kokubu ...................... 235/492 |
| 5,739,814 A | * | 4/1998 | Ohara et al. ................ 345/173 |
| 6,021,306 A | * | 2/2000 | McTaggart .................. 434/317 |
| 6,039,356 A | | 3/2000 | Warther et al. |
| 6,068,192 A | * | 5/2000 | McCabe et al. ............ 235/487 |
| 6,101,477 A | | 8/2000 | Hohle et al. |

* cited by examiner

Primary Examiner—Karl D. Frech
Assistant Examiner—Seung H Lee
(74) Attorney, Agent, or Firm—Robert W. Pitts

(57) ABSTRACT

A multi-page key card pamphlet is suitable for use with conventional electronic locks, and replaces the conventional one-piece key card having only two sides. The multi-page format provides additional space for printed material, while still being suitable for use in a conventional electronic lock. A programmable medium, such as for example a magnetic stripe or an integrated circuit device suitable for use on a Smart Card is located on one surface of the key card pamphlet. The multi-page key card pamphlet can be fabricated by folding a sheet having a thickness less than that of a conventional key card. A two panel key card thus contains twice as much space for printed matter as a conventional key card, and printed matter can be included on inside pages or surfaces as well as on the exterior of the key card.

39 Claims, 10 Drawing Sheets

ELECTRONIC ACCESS SECURITY KEY CARD PAMPHLET

CROSS REFERENCE TO RELATED PATENT APPLICATIONS

This application claims the benefit of prior filed, copending Provisional Patent Application Ser. No. 60/238,796 filed Oct. 6, 2000.

BACKGROUND OF THE INVENTION

1. Field of the Invention

This invention is related to key cards of the type that are commonly used to activate electronic locks of the type used in hotels and other secured facilities. This invention is also related to the use of these key cards or card keys to provide information, in the form of printed matter that can include advertising, maps, instructions, text, graphics or other visual media, to the user of the card. This invention is related to cards having magnetic stripes with encoded data or to Smart Cards or Integrated Circuit Cards that have accessible memory stored in the card.

2. Description of the Prior Art

Hotels, office buildings and similar facilities employ electronic locks that include a card reader in the electronic lock. The electronic lock can be activated to unlock the door by insertion of a key card or card key, which includes encoded data, into a slot adjacent to the electronic lock reader. Typically, these cards include a magnetic stripe on the exterior of a relatively rigid plastic substrate. Insertion of the card into the card slot brings the magnetic stripe into close proximity with the reader. Typically the key cards used in such facilities are reused. The data encoded on the magnetic stripe, or other programmable media, can be erased and replaced at the time the key card is issued. This is a common practice in the hotel industry. Normally, these key cards include printed information on one or both of the external faces of the key card. The logo, identity, address and telephone number of the specific hotel and instructions for proper use of the cards are often included in areas adjacent the magnetic stripe. In some instances advertising or other information is also included on the exterior of the cards, but space for insertion of printed information is limited on conventional key cards.

SUMMARY OF THE INVENTION

The key card pamphlet according to this invention comprises a key card for use in an electronic lock that includes a reader. The key card or key card pamphlet includes coded information detectable by the reader so that the electronic lock can be opened. The key card has at least two panels joined on adjacent edges of the two panels to form a key card pamphlet. Each panel has an inside surface and an outside surface so that each panel forms two pages. Printed informational matter is located on the inside surfaces or pages of the two panels, and printed informational material can be included on the exterior pages as well. The printed informational matter is visible when the two panels are opened to reveal the printed informational matter on the inside pages. The key card pamphlet can be fabricated to have substantially the same overall dimensions as a conventional key card. Of course, other size cards can also be employed. A magnetic stripe or other programmable storage medium is mounted on an exterior face of the card where it can be detected by a key card reader in a conventional electronic lock, such as those commonly used in hotels and other facilities. The key card pamphlet or booklet provides additional space for the inclusion of information, such as printed advertising information.

A key card pamphlet in accordance with this invention can include more that two pages of printed matter and can be fabricated from conventional materials, such as paper, plastic, or man made fibers that serve as suitable substrates for commercial printing. Preferably the key card pamphlet is fabricated by printing multiple cards on a single sheet, and then separating individual cards, at which point the cards are folded to form the multi-page key card pamphlet. The key card pamphlet can also be fabricated by stapling, riveting, gluing, sewing or binding the individual pages. The printed matter can include, but is not limited to instructions, security issues, diagrams, maps, advertising or any other information. The key card pamphlet can also be used to furnish hotel guests with specific information concerning a special event, such as a convention. For example, a diagram of the convention hall could be included on the key card. Since a guest would normally have the key card in his possession, information of this type would be especially useful, and the key card pamphlet provides a convenient reminder or reference device.

DETAILED DESCRIPTION OF THE PREFERRED EMBODIMENTS

Figures 1A, 1B:
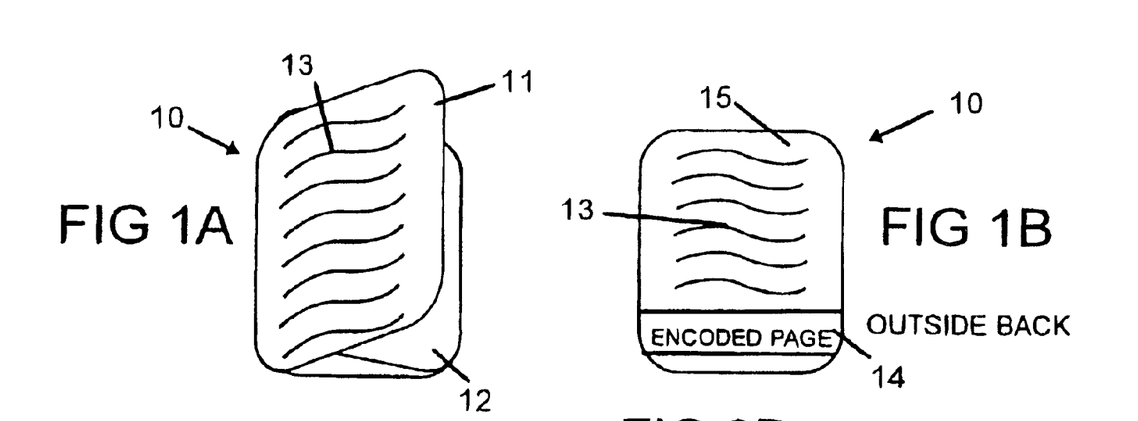
FIGS. 1A and 1B are respectively front and back views of an electronic access security key card pamphlet having a plurality of pages on which printed matter can be placed. The key card pamphlet can be used to activate a conventional door lock or other secured areas.

A number of different embodiments of a multi-page or multi-panel key card pamphlet are depicted in FIGS.

1A–1B. Since the thickness of each separate panel is less than the thickness of a standard key card used in a conventional door lock, a pamphlet having more that the two sides or pages of a conventional one layer key card can be used not only to open an electronic lock in the same manner as a conventional key card, but also will provide additional pages or surface area on which printed informational matter can be displayed.

FIG. 1A shows a key card pamphlet 10 having a front panel 11 that is hinged relative to a back panel 12 so that the front panel can be rotated relative to the back panel to reveal inside surfaces or pages of the pamphlet or booklet. FIGS. 1A and 1B show printed that printed informational material 13 can be displayed on the exterior surfaces of the hinged key card pamphlet 10. Similarly printed informational material can be located on the inside or inwardly facing pages of the hinged key card pamphlet 10. A programmable storage medium in the form of a magnetic stripe 14 is located on an exterior surface 15 of the outside back panel 12. This magnetic stripe 14 is adhered to the page 15 in a conventional manner, and unique coded information can be stored on and erased from this magnetic stripe 14 in the same manner as for a conventional one piece plastic key card or card key used with a conventional electronic lock. Although the embodiment of FIGS. 1A and 1B has the magnetic stripe 14 or programmable storage medium located on the outside back panel 12, it should be understood that the storage medium could also be located on the front panel. The terms front and back can be used interchangeably. This same observation is applicable to each of the other embodiments of FIGS. 1–7 inclusive, and the terms front and back have no special meaning with respect to any of the embodiments.

The overall dimensions of the key card pamphlet 10 are substantially the same as the dimensions of a conventional key card. Key card pamphlet 10 can be up to four inches in width and can be up to five inches in height. In practice, the height and width will be substantially the same as a conventional key card that is to be used in a selected facility. It has been determined that the height of conventional key cards vary between a minimum of 3.25 inches and a maximum of 5 inches. The width of conventional key cards vary from a minimum of 1.75 inches to a maximum of 4 inches. The key card pamphlet according to this invention is adaptable to any dimensions within this conventional range. The total thickness of the multi-page or multi-page key card pamphlet will also be the same as the thickness of a conventional key card. This thickness can be up to 0.032 in. (referred to in the trade as 32 mil) for most applications. It therefore follows that the thickness of the individual overlapping panels 11 and 12 will be less that the overall thickness of the multi-panel pamphlet. For a two panel pamphlet the thickness of the individual panels 11 and 12 will therefore be approximately 0.016 inch. It has been found that informational material can be printed on synthetic paper, coated or uncoated paperboard, rigid vinyl, PVC or similar plastic material. Informational material can also be printed on cold or thermal formed clear or colored laminates having a thickness of between 0.001 to 0.010 inch. Although these materials have been found suitable for this purpose, it should not be assumed that other forms of paper, plastic, man made fibers or some combination thereof would not be suitable for use in a key card pamphlet of this type. It follows then that a pamphlet having more than two panels can be employed as a substitute for a conventional 0.032 inch thick key card.

One approach for fabricating a multi-panel key card is to print informational material on opposite sides of a single sheet containing a plurality of printed pages or panels. Uncoded magnetic stripe 14 can also added to the selected individual panels while still part of a single sheet. The encoded panels can be added after the printing process or the panels can be fabricated or purchased with the magnetic strip included prior to printing. The individual pamphlets are then cut to shape and the panels or pages are formed by folding the sheet. The chosen material must be capable or retaining a crease or hinge line when folded in this manner. The sheet materials referred to previously are suitable for this purpose.

The printed material that can be added to key card pamphlets, such as pamphlet 10 can include, but is not limited to instructions, security matters, diagrams, maps, advertising or any other information. Key card pamphlets of this type can also be tailored to a specific event. For example, special information relevant to a convention or meeting can be printed on room key cards issued to guests at a hotel at which the convention or meeting is being held.

Figure 2A:
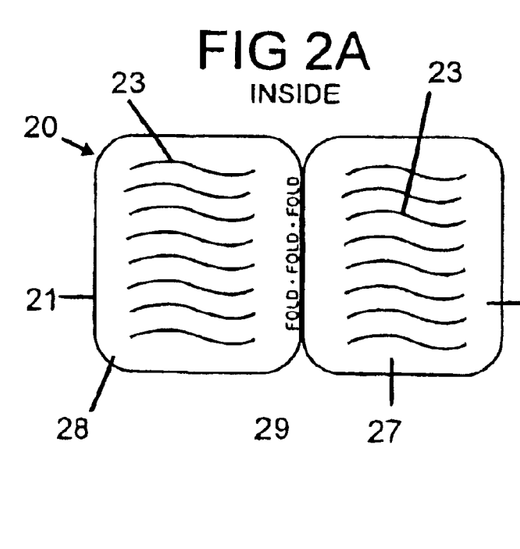
FIGS. 2A and 2B are inside and outside views of a four page or two panel key card pamphlet formed by folding a sheet to form a hinge extending from top to bottom.
Figure 2B:
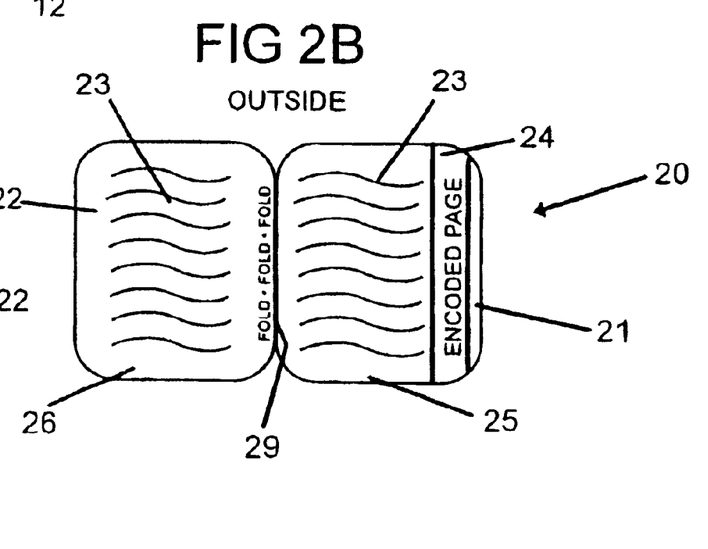

Individual key card pamphlets can have a variety of shapes. FIGS. 2A and 2B respectively show the inside surfaces and outside surfaces of a four page key card pamphlet 20. This four page key card pamphlet is formed by two panels 21 and 22 to form four pages 25, 26, 27, and 28, all of which contain visible informational material in the form of printed matter 23. A magnetic stripe 24 is located on an outside surface or page 25 where the magnetic stripe 24 can be positioned in close proximity to a reader in an electronic lock with which the key card pamphlet 20 is to be used. The two panels 21 and 22 are folded about a central fold line 29 extending from the top to the bottom of the key card pamphlet 20. Note that this fold line 29 extends generally parallel to the magnetic stripe 24. Although the magnetic stripe 24 is show adjacent to a free edge of panel 25 in FIG. 2B, it should be understood that the magnetic stripe 24 could be located at any place on this outside page including immediately adjacent to the fold line 29.

Figures 3A, 3B:
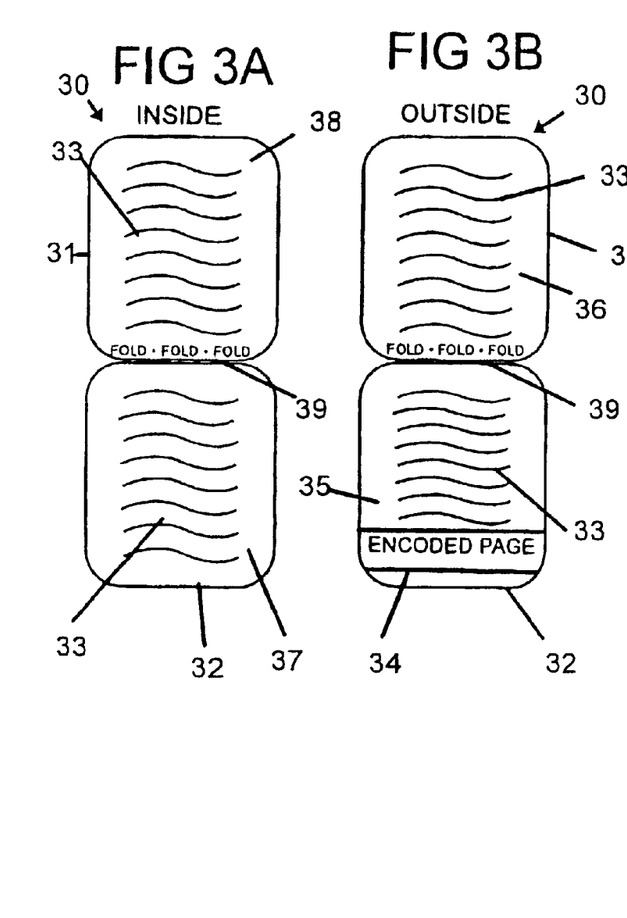
FIGS. 3A and 3B are inside and outside views of a four page or two panel key card pamphlet formed by folding a sheet to form a hinge extending horizontally between opposite sides of the sheet.

FIGS. 3A and 3B also show a four page folded key card pamphlet 30, but in this case the fold line 39 extends horizontally between opposite side edges to separate the key card pamphlet 30 into two panels 31 and 32 forming four pages 35, 36, 37 and 38, all of which contain printed informational material 33. A magnetic stripe 34 is located on an external page 35. As shown in FIG. 3*b*, this magnetic stripe 34 extends between the opposite sides or in the direction of the width or shortest dimension of the individual page. It should be understood, however, that the magnetic stripe 34 could extend at right angles relative to the orientation shown in FIG. 3B. In that configuration the magnetic stripe would extend perpendicular to the fold line 39 and not parallel to it as shown in FIG. 3B. If the magnetic strip is indeed oriented perpendicular to the fold line 39, then the fold line 39 can form the leading edge of the key card pamphlet 30 when it is inserted into a slot of a conventional electronic lock, thus limiting damage to the key card pamphlet due to stubbing.

Figures 4A, 4B:
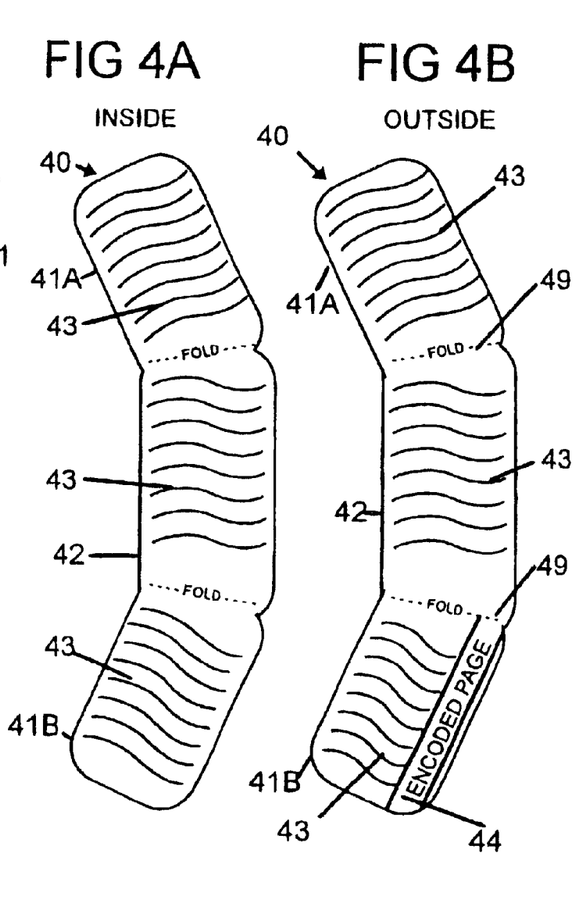
FIGS. 4A and 4B are inside and outside views of a six page or three panel key card pamphlet formed by folding a sheet along two fold lines extending horizontally.

FIGS. 4A and 4B show that the key card pamphlet is not limited to a four page or two panel configuration. Key card pamphlet 40 has three panels 41A, 42 and 41B to form six pages, all of which contain printed informational material 43. A magnetic stripe 34 is located on an exterior face or page of panel 41B where it can be positioned adjacent to a magnetic stripe reader in an electronic door lock.

Figures 5A, 6A:
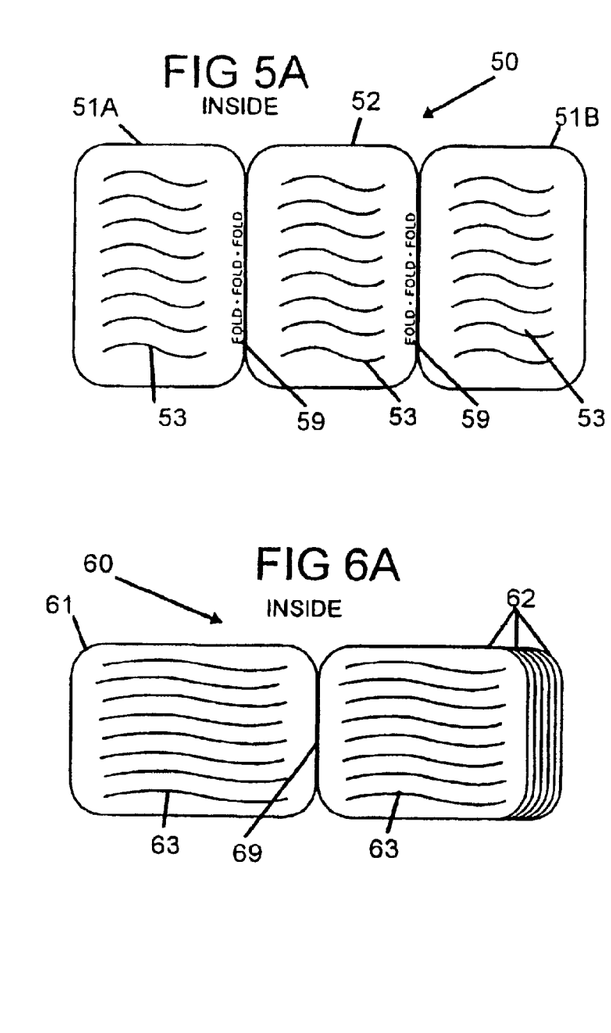
FIGS. 5A and 5B are inside and outside views of six page or three panel key card pamphlet formed by folding a sheet along two fold lines extending vertically.
FIGS. 6A and 6B are inside and outside views of a multi-page key card pamphlet in which individual panels are bound along one edge in the fashion of a book.
Figure 5B:
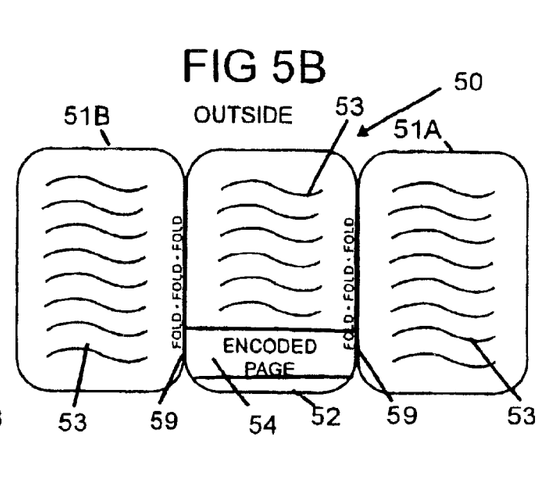

FIGS. 5A and 5B show another version of a key card pamphlet 50 in which multiple vertical fold lines 59 extend vertically between the top and bottom to form three panels 51A, 52 and 51B with six pages containing printed matter 53. As shown in FIG. 5B the magnetic stripe 54 is located on the exterior surface of the central panel 52. As discussed previously, the orientation of the magnetic stripe 54 is not limited to the direction shown in FIG. 5B.

Figure 6B:
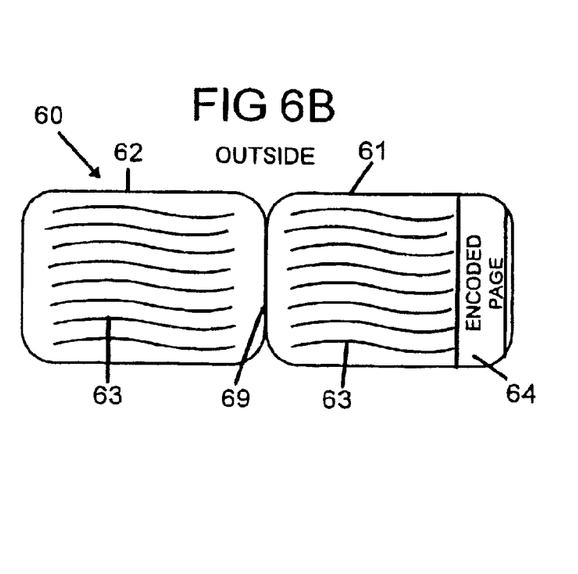

FIGS. 6B and 6C show that key card pamphlets need not be limited to the folded sheet configurations shown in FIGS. 1–5 inclusive. Key card pamphlet 60 includes a number of panels 61, 62 that are bound or secured in book form along an edge 69. Here to printed matter can be displayed on pages on opposite sides of individual panels 61 and 62 and a magnetic stripe 64 is located on an external page. Of course for a multi-page configuration, such as shown in FIGS. 6A and 6B, the thickness of the individual panels must be substantially less than for a two panel configuration.

Figure 7A:
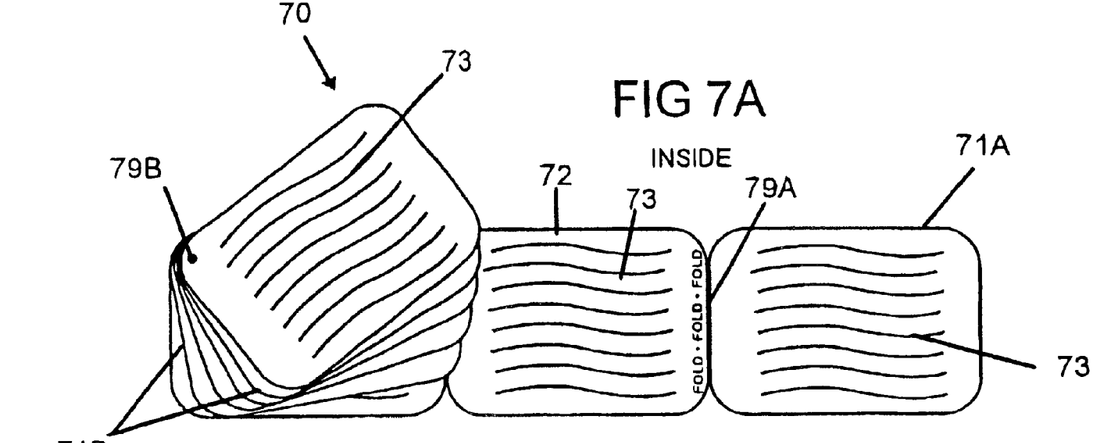
FIGS. 7A and 7B are inside and outside views of a multi-page key card pamphlet in the form of a fan as individual panels shift relative to a rivet or other means for securing the panel at one corner.
Figure 7B:
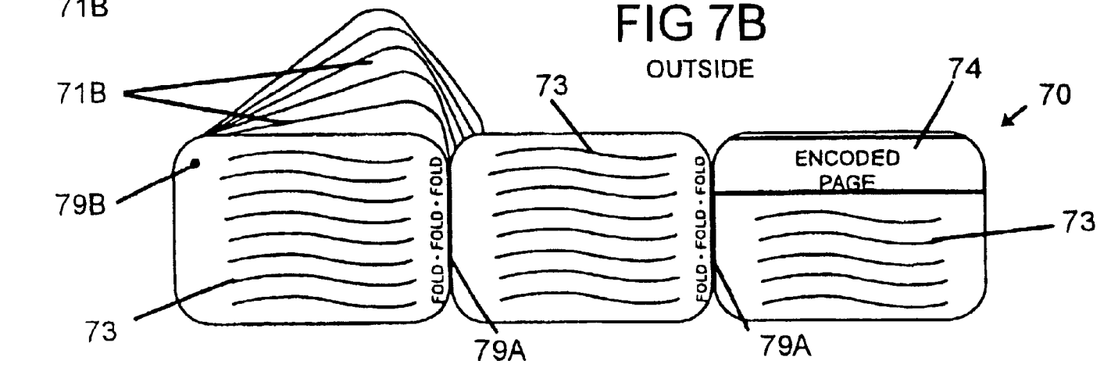

FIGS. 7A and 7B show still another multi-page configuration. Key card pamphlet 70 includes a conventional three panel configuration comprising three panels 71A, 72 and 71B joined along fold lines 79A between adjacent panels. However additional panels 71A are secured together by a rivet 79B located along a corner of multiple panels 71B to form a fan shaped configuration. As with the other configurations, printed material 73 can be located on all pages and a magnetic stripe 74 is located on an external surface.

Figures 8A, 8B, 8C:
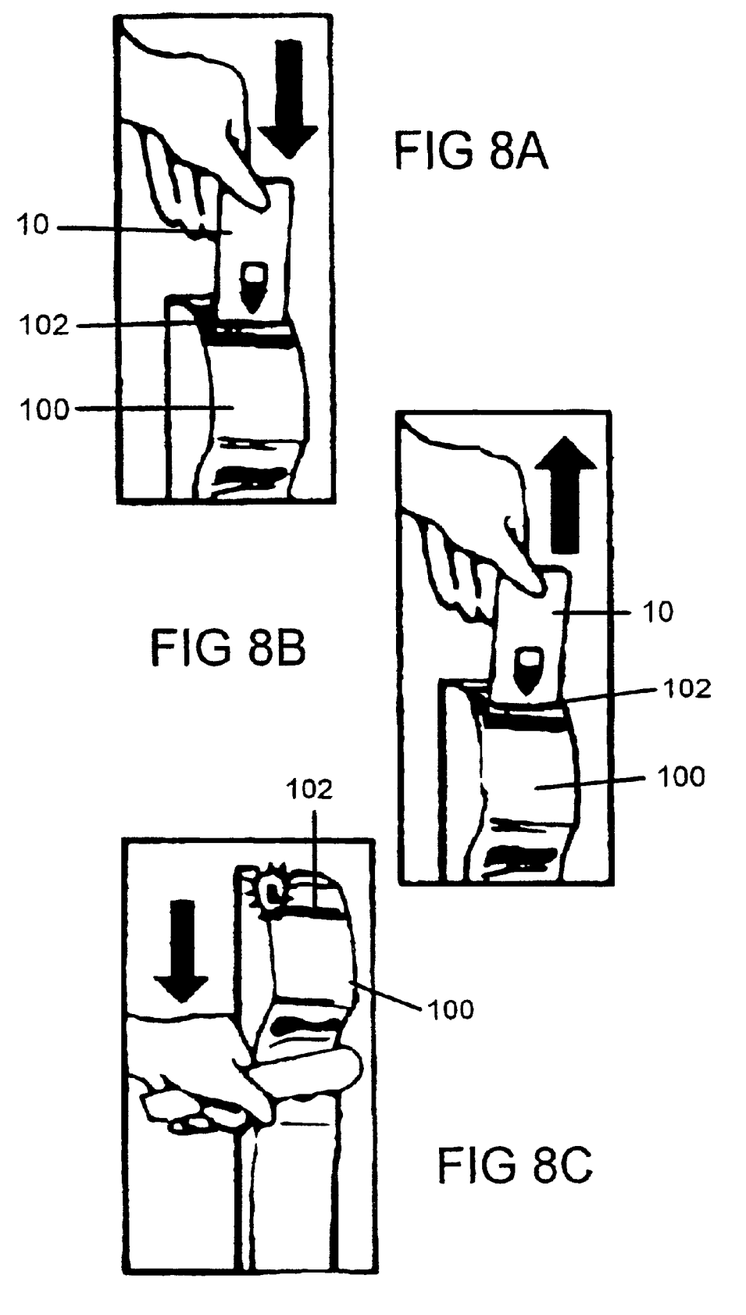
FIGS. 8A–8C show the manner in which a key card pamphlet can be inserted into a conventional electronic door lock to open a door.

FIGS. 8A–8C show the manner in which a key card pamphlet, such as that shown in FIGS. 1–7 inclusive, can be used with a conventional electronic lock 100. As shown, a key card pamphlet 10 would be gripped by a user to hold the panels together so that the key card pamphlet 10 can be inserted into an electronic lock slot 102. The magnetic stripe would be located on an external surface in substantially the same position as for a convention one piece key card. Thus the magnetic stripe and the information encoded on the magnetic stripe will be in substantially the same position relative to a reader in the electronic lock as would a magnetic stripe on a conventional one-piece key card. Since the multi-page key card pamphlet 10 has the same thickness as the conventional key card, it will fit within the same slot 102 and will also serve to properly position the magnetic stripe relative to magnetic reader. It should be understood that the magnetic stripe or other machine readable storage medium or recordable medium containing encoded data could also be on the side of the key card facing the user, should the card reader be configured in that manner.

Since the magnetic stripe 14 used on key card pamphlet 10, as well as the other magnetic stripes used on other embodiments, is substantially the same as the magnetic stripe used on conventional key cards, it can be used to store the same type of encoded data. This encoded material can be added to a specific key card pamphlet and this coded material can also be erased in conventional fashion to permit reuse of the key card pamphlet. However, the multi-page format of the key card pamphlet by increasing the display space for printed informational material increases the value of the key card pamphlet itself and permits additional uses of the key card. For example, the multi-page key cards provide additional display space for advertisers who wish to provide products and services to hotel guests. Information relative to a specific event, such as a convention, can be included in the key card pamphlet, which could then serve as a portable reference by the guest. Additional magnetic stripes can also be added on the additional planar members or pages for other uses. Individual pages or planar members can also be detachable and perforations can be included for this purpose.

Figure 9:
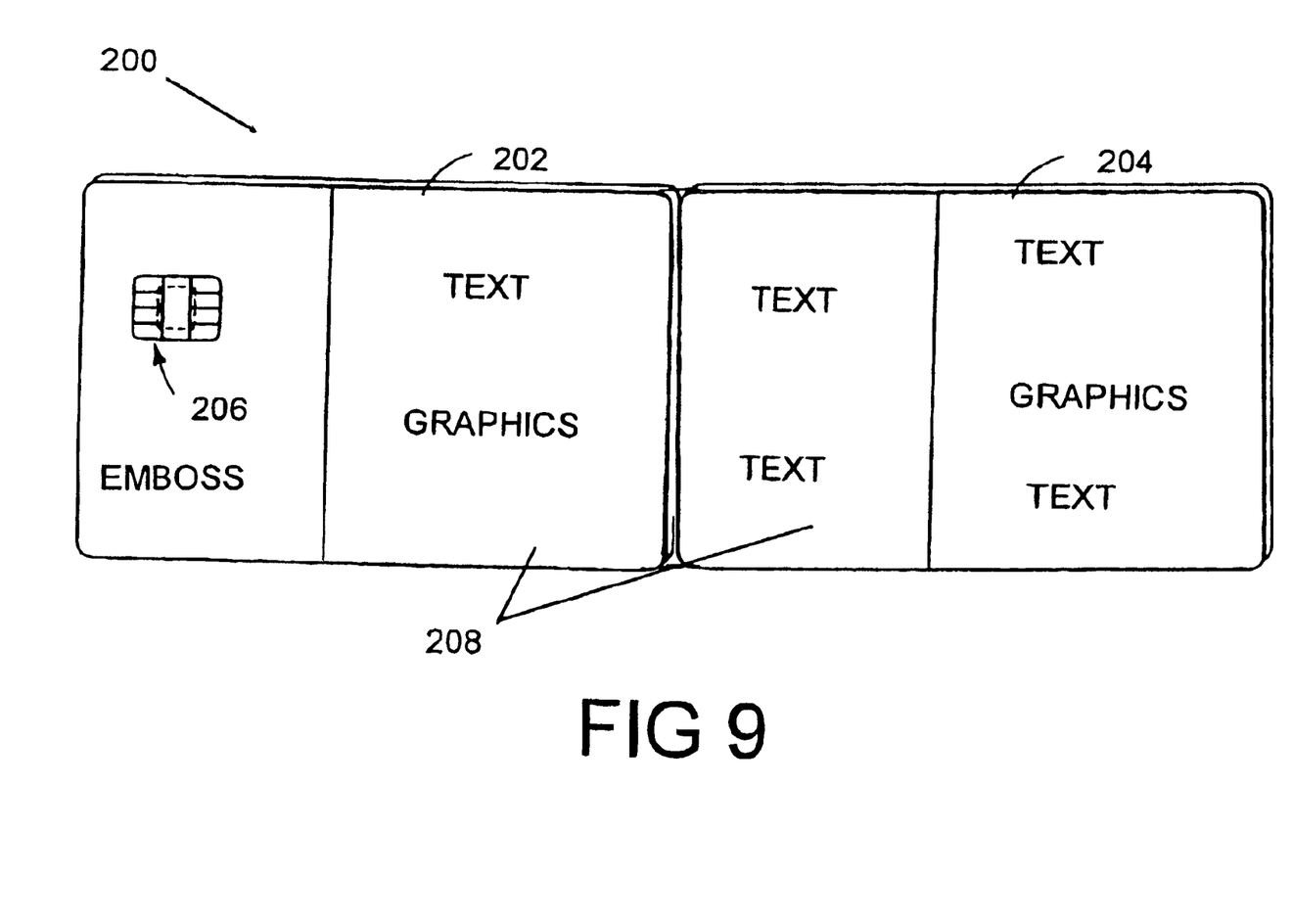
FIG. 9 is a view of an embodiment of this invention in the form of a smart card having standard dimensions for use in conventional reading devices but also having an additional hinged section that can contain additional material.
Figure 10:
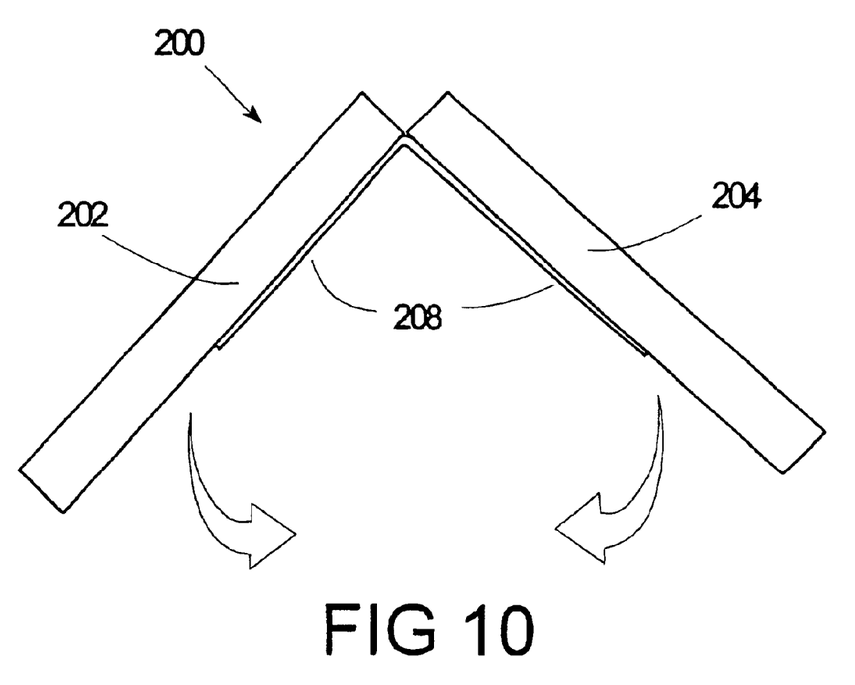
FIG. 10 shows the card of FIG. 9 as it is hinged to form a compact portable package.
Figure 11:
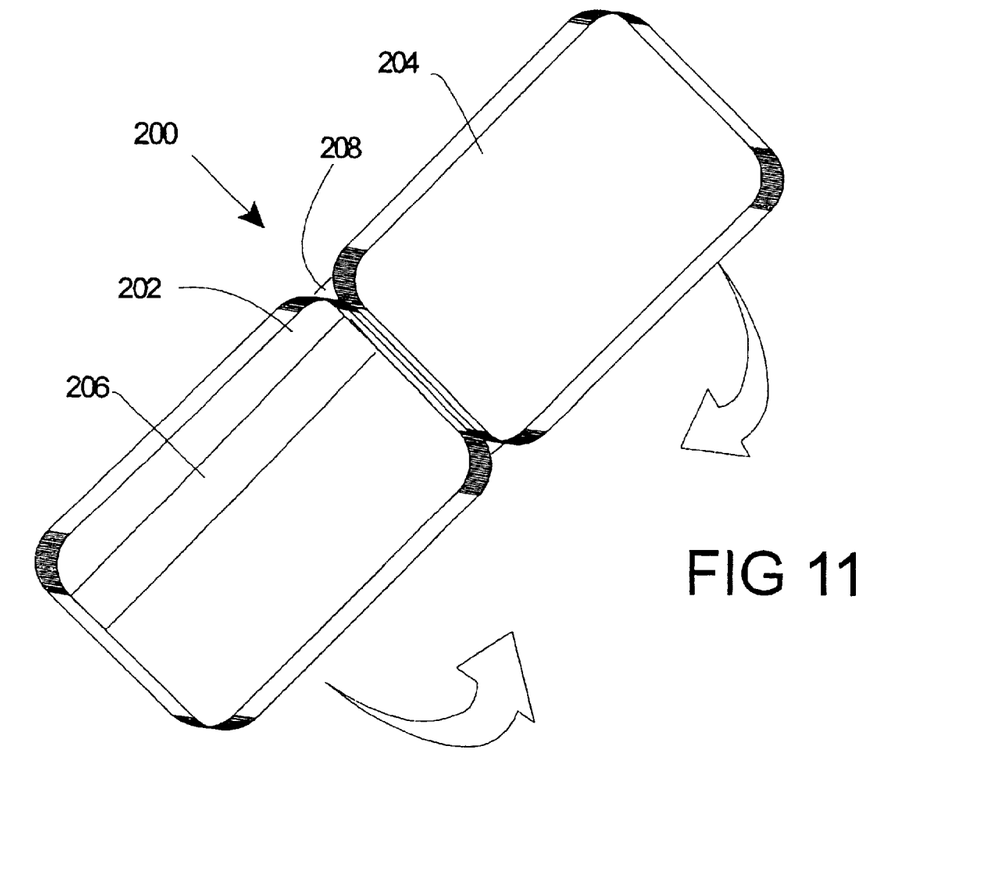
FIG. 11 shows the opposite side of the hinge smart card assembly shown in FIG. 10.

Another approach suitable for a key card or a data card having a single function or multiple functions is shown in FIGS. 9–11. This embodiment is especially suitable for Integrated Circuit Cards (ICC) or Smart Cards in which an integrated circuit device including some form of accessible memory is included on the card. The essential integrated circuit member used in these cards is the memory module. Different types of memory can be incorporated in these cards, including ROM (read only memory), PROM (Programmable read only memory), EPROM (Erasable programmable PROM), EEPROM (Electrically erasable PROM) and RAM (Random access memory). CPU's and security logic, among other subcomponents, can also be included in these Smart Cards. A representative Smart Card is described in U.S. Pat. No. 6,101,477, which is incorporated herein by reference.

The assembly 200 shown in FIGS. 9–11 can employ a single card or planar member 202 that has the thickness of a standard credit card. The first planar member 202 can have the dimensions of an ISO ID1 standard Smart Card. Such a card complying with International Standards Organization requirements would have the dimensions of approximately 85.6 mm.×53.98 mm.×0.76 mm. If first planar member 202 were to have these dimensions, only the first planar member could be inserted into standard Smart Card readers where the thickness of the card may be critical to establishing contact with the input output contacts 206 located on the surface of the card 202. One reason why the first planar member 202 of the assembly 200 would have the same thickness as a standard Smart Card is simply that the manufacture of these cards is more involved than the manufacture of conventional credit cards or key cards, and the manufacture of thinner cards for use in the assembly 200 may not be cost effective.

The assembly shown in FIGS. 9–11 provides a means for including additional printed matter on the card assembly 200, even if the first planar member has a thickness of approximately the same thickness as a standard Smart Card, a credit card or a key card. The assembly includes a second planar member 204 hinged to the first planar member 202 by a flexible membrane or sheet 208 that is bonded to adjacent surfaces of the two planar members 202, 204. This flexible membrane 208 comprises a plastic sheet that is bonded to surfaces of the two planar members 202, 204 by a suitable adhesive. This membrane is laminated to the cards 202, 204 by applying an adhesive and then heating the laminate structure. The membrane 208 is bonded to inside surfaces of both planar members 202, 204. This permits the two planar members to fold inwardly as shown by the arrows in FIG. 10 from an open position, shown in FIG. 9 in which the two planar members are positioned end to end in the same plane, to a folded position in which the two inside surfaces will lie side by side. By folding the two planar members 202, 204, no slack need be provided for the flexible membrane 208, which folds over on itself In the preferred embodiment, the flexible membrane 208 is clear or optically transparent and an optically transparent or clear adhesive is used to bond the hinging membrane 208 to the two planar members or cards 202, 204. By using a clear membrane, informational material may be printed on both cards so as to visible to the user. Printed matter could thus be applied to the cards before they are joined by the clear membrane 208. This approach provides additional surface area for printed informational material, which may be in the form of instructions, informational material related to or unrelated to the use or uses of the cards, or advertising material. The additional space can also be used to include legal notices, consumer information or statements that may be required by regulatory agencies before the Smart Card can be employed as part of regulated transactions. In some cases, existing Smart Cards may not be large enough to include legible notices of this type. For multifunctional cards, such additional display area may be important to permit the user to effectively take full advantage of the capabilities of the card. As shown in FIG. 9, this printed matter can be in the form of text or graphics. Other information, such as bar codes or UPC's, can also be printed, embossed or added to this additional display area. In other embodiments, printed matter could be applied to the membrane 208 and the cards 202, 204 after the laminate structure is fabricated.

ISO standards for Smart Cards provide for the inclusion of a magnetic strip 206 in addition to the integrated circuit device. The magnetic stripe 206 would be on the opposite side of the card or planar member 202 from the I/O Smart Card interface 206 according to ISO standards. This would be another reason for placing the flexible membrane 208 on the inside surface of planar member 202 and not on the outside surface where it would physically interfere with reading coded information stored on the magnetic stripe 206. Of course the magnetic stripe 206 would not be required on an Integrated Circuit Card or Smart Card, and the I/O interface could be located on the outside surface of the card. An added advantage of placing the I/O interface on the inside of the card is that the I/O interface contacts 206 would be protected from adverse environmental effects and contamination by the other card or planar member 204 in the closed or folded configuration. The instant invention is, however, not limited to use with cards having exposed electrical contacts, generally fabricated from a noble metal, such as gold. It can also be used with contactless Smart Cards that employ inductive, capacitive or even optical I/O interfaces.

Although the configuration shown in FIGS. 9–11 would offer special advantages when used with a Smart Card or Smart Card chip, this configuration can also be used with other types of encoded data carriers, such as a magnetic stripe card that does not include an integrated circuit or an accessible memory device. It is also not necessary for both of the planar members or cards 202, 204 to have the same thickness. For example the card 204 could be substantially thinner that the card 202, and need not be fabricated from the same material. For example, the card 202 could be fabricated from a plastic and the card 204 could be fabricated from a stiff paper. This invention is also not limited to a two page or two panel pamphlet as shown in FIG. 9–11. Additional pages or panels can be added by adding additional flexible hinges or membranes between additional pages. The laminated hinge could also be formed along one of the longer edges of the rectangular Smart Card. Furthermore, the cards need not conform to conventional Smart Card dimensions. Smart Cards of this type could be fabricated to have the longer thinner dimensions employed in some key cards used with electronic locks.

Figure 12A:
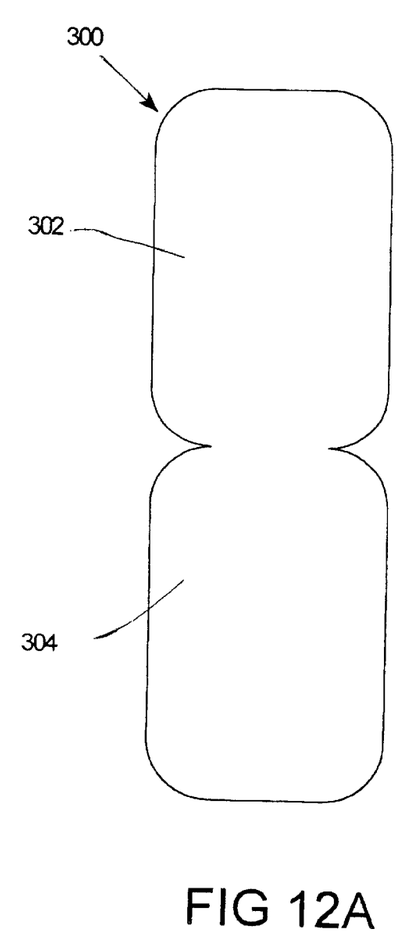
FIGS. 12A–12D show a one-piece folded card having a living hinge joining two pages, and illustrate one method of fabricating a card with a living hinge.
Figure 12B:
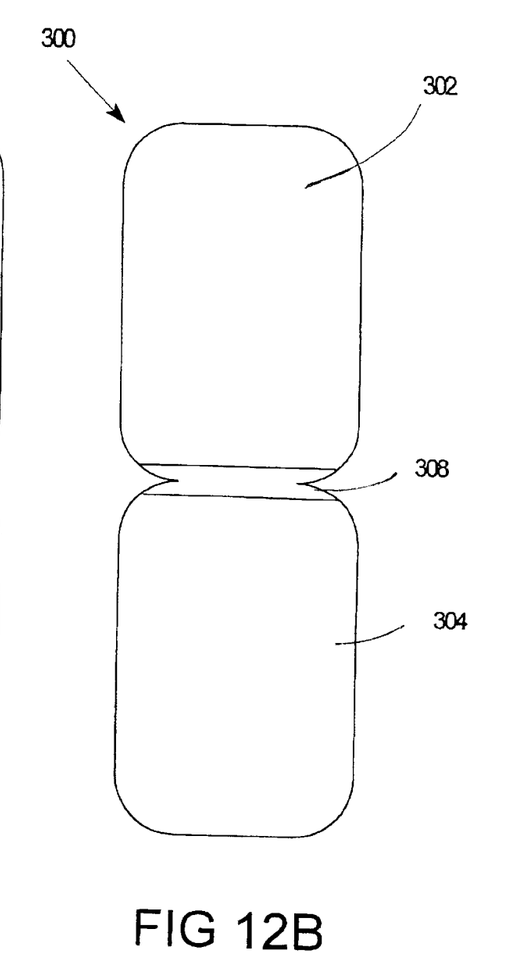
Figure 12C:
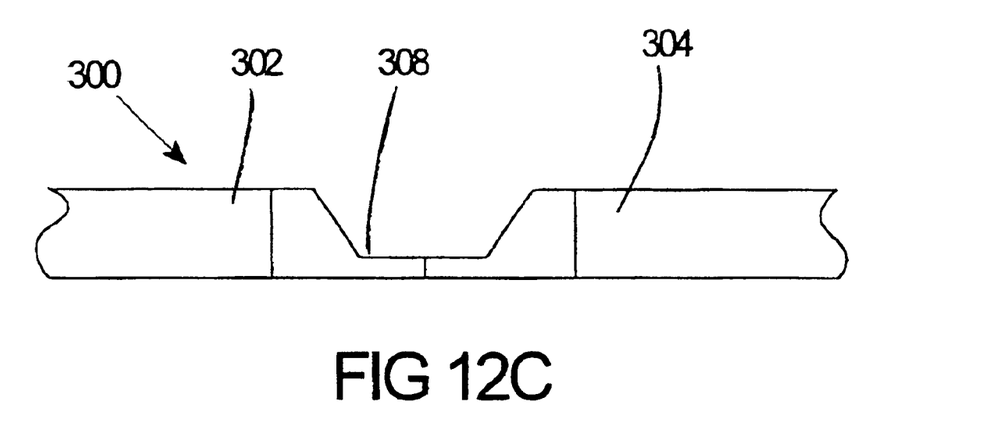
Figure 12D:
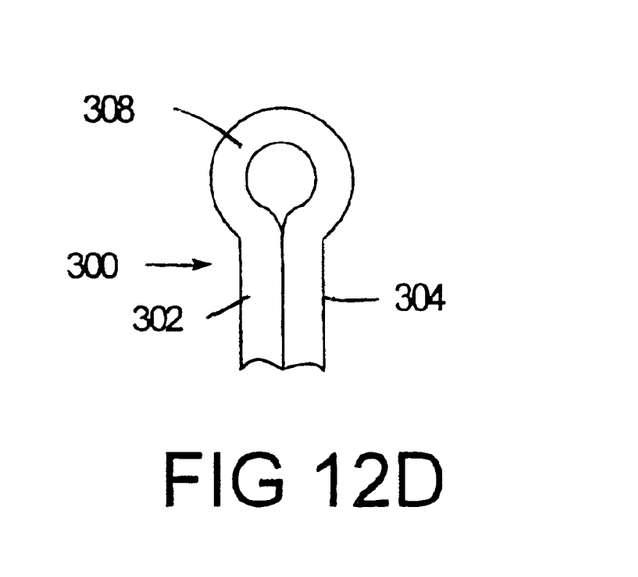

FIGS. 12A–12D disclose another embodiment of a folded key card, credit card or Smart Card having multiple pages. The card 300 shown in FIGS. 12A–12D has two pages or planar members 302, 304. Text and graphics or other printed matter can be added to these pages in the same manner as discussed with respect to the other embodiments. Pages 302, 304 are, however, joined together by a living hinge 308, which comprises an integral part of a one piece plastic member. The living hinge 308 comprises a thinner section of the card that is sufficiently flexible to allow the two pages 302, 304 to be folded to a closed configuration in which they are side by side. One method of manufacturing such a flat one-piece member having a living hinge 308 would be to injection mold the card 300 and form the living hinge 308 as part of the same molding process. Another approach is shown in FIGS. 12A–12C. FIG. 12A shows a blank card that is molded as a flat member. The two halves that will form the two pages 302–304 are partially separated by the curved edges formed to relieve shape corners. Typically printed matter and a recording medium, such as an integrated circuit memory component or a magnetic strip would have been applied at this stage. The next step in fabricating a card 300 with a living hinge would be to skive or cut the thin section forming the living hinge 308. Removal of material to form the living hinge 308, while the card 300 is in a flat condition, is shown in FIGS. 12B and 12C. After material has been removed in this manner, the two pages 302, 304 can be folded to a side by side closed position, as shown in FIG. 12D because the thinner living hinge 308 has sufficient flexibility. A card manufactured in this manner could have the same thickness as a standard credit card and could be unfolded to permit insertion of one page 302, including a recording medium into a reader or electronic slot. Since the free end of the card would be inserted it would also be possible to make this card longer than a standard card in order to further increase the display area.

These and other alternative embodiments including equivalent structures can be employed in a card suitable for use in an electronic reader or electronic lock, and this invention is not limited to the representative structures described herein, but is instead defined by the following claims.

I claim:

1. A key card for use in an electronic lock, the lock including a reader, the key card including coded information detectable by the reader so that the electronic lock can be opened, the key card comprising at least two panels joined on adjacent edges of the two panels, each panel having an inside surface and an outside surface, each panel also comprising a printing substrate, the key card being insertable into the electronic lock in a closed configuration in which only the outside surfaces of each panel are exposed; printed informational matter being printed on the exterior of the inside surfaces of the two panels, the printed informational matter being visible when the two panels are opened to reveal the printed informational matter, the key card having a larger display space for printed informational matter than available on a single two-sided panel having the same external dimensions as the key card when folded.

2. The key card of claim 1 wherein the two panels are hinged along adjacent edges.

3. The key card of claim 2 wherein the two panels comprise sections of a folded sheet.

4. The key card of claim 1 wherein the two panels have a combined thickness of up to 0.032 inch.

5. The key card of claim 1 wherein the combined thickness of the two panels is approximately the same as the thickness of a card with which the reader is used.

6. The key card of claim 1 wherein the coded information on the key card comprises information encoded on a programmable magnetic stripe.

7. The key card of claim 6 wherein the magnetic stripe is located on and outside surface of one of the panels.

8. The key card of claim 1 wherein the coded information on the key card is erasable and is replaceable by different coded information to permit reuse of the key card.

9. The key card of claim 1 including a third panel, one of the panels being joined to both of the other panels.

10. The key card of claim 1 having a width of up to four inches and a height of up to five inches.

11. An apparatus for providing information to a user comprising a key card for use in unlocking an electronic door lock, the key card comprising a pamphlet having multiple inside pages and multiple outside pages, the key card being insertable into the electronic lock in a closed configuration, at least the inside pages comprising a printing substrate and including printed informational matter that can be referenced by the user, the key card also including a programmable storage medium on which coded information accessible by the electronic door lock can be stored, whereby the amount of informational matter on a key card can be increased so that the display space available for printed informational matter is larger than the dimensions of an electronic door lock card receiving slot.

12. The apparatus of claim 11 wherein informational matter is also located on outside pages.

13. The apparatus of claim 11 wherein the programmable storage medium is located on one outside page.

14. The apparatus of claim 13 wherein the programmable storage medium comprises a magnetic stripe.

15. The apparatus of claim 11 wherein the coded information is erasable from the programmable storage medium to permit reuse of the key card.

16. The apparatus of claim 11 wherein the pamphlet comprises a folded sheet with the multiple inside and outside pages comprising sections of the folded sheet.

17. The apparatus of claim 11 wherein the informational matter comprises printed matter.

18. A booklet for distribution to individual users comprising a document having a multi-page format including a pair of outwardly facing pages and at least two inwardly facing pages, each inwardly facing and outwardly facing page comprising a printing substrate and including printed matter printed thereon, one of the outwardly facing pages also including a programmable machine readable member including coded information unique to an individual user, whereby the multi-page format increases available display space for printed matter and the document retains a length, width and thickness suitable for use in a machine for reading the coded information on the programmable machine readable member.

19. The booklet of claim 18 comprising an advertising display including a plurality of separate advertisements in the form of printed matter on the pages.

20. The booklet of claim 18 wherein the document comprises a key card having dimensions suitable for use in an electronic door lock.

21. The booklet of claim 18 wherein at least one additional programmable machine readable member in the form of a magnetic stripe is added to a second page.

22. The booklet of claim 18 wherein at least one of the pages is detachable from the booklet.

23. A smart card assembly comprising first and second hinged planar members, the first planar member including an integrated circuit with accessible memory, the second planar member having an inside surface and an outside surface, both the inside and outside surfaces comprising printing substrates with printed display matter printed thereon to increase space available for the printed display matter, the first and second planar members being joined by a relative thin, flexible membrane bonded to inside surfaces of the first and second planar members, the membrane permitting the first and second members to be disposed in either an open coplanar configuration or in a folded position with the inside surfaces being in contact with each other, the smart card assembly being insertable into a reader in the folded position, wherein printed display matter is visible when the first and second display members are in the open configuration but not visible in the folded position.

24. The smart card assembly of claim 23 wherein the first planar member includes an I/O interface for accessing the integrated circuit and the accessible memory.

25. The smart card assembly of claim 24 wherein the I/O interface comprises a contactless interface.

26. The smart card assembly of claim 24 wherein the I/O interface comprises electrical contacts exposed on the inside surface of the first planar member.

27. The smart card assembly of claim 26 wherein the electrical contacts are disposed adjacent a first end of the first planar member and the flexible membrane is bonded to an opposite second end of the first planar member so that the flexible membrane does not cover the electrical contacts.

28. The smart card assembly of claim 26 wherein flexible membrane comprises an optically transparent membrane.

29. The smart card assembly of claim 28 wherein printed display matter is disposed beneath the optically transparent membrane.

30. The smart card assembly of claim 23 wherein printed display matter is disposed on the optically transparent membrane.

31. The smart card assembly of claim 23 wherein a magnetic stripe is disposed on the outside surface of the first planar member.

32. The smart card assembly of claim 23 wherein the first planar member includes an embossed area on the inside surface thereof, the flexible membrane being spaced from the embossed area.

33. A pamphlet including electronically accessible programmable storage area and printed informational material printed on opposite visible surfaces of the pamphlet, the visible surfaces comprising printing substrates, the pamphlet comprising first and second hinged planar members joined by a flexible membrane bonded to each of the planar members at adjacent ends thereof, the flexible membrane being spaced from the programmable storage area so as not to interfere with access to the programmable storage area for read operations.

34. The pamphlet of claim 33, wherein the flexible membrane is spaced from the programmable storage area so as not to interfere with access to the programmable storage area for read and write operations.

35. The pamphlet of claim 33 wherein the first planar member has a thickness of 0.76 mm.

36. The pamphlet of claim 33 wherein the first and second planar members have approximately the same thickness.

37. The pamphlet of claim 33 wherein the programmable storage area comprises an integrated circuit device with accessible memory.

38. The pamphlet of claim 33 wherein the programmable storage area comprises a magnetic strip bonded to a face of the first planar member on a surface opposite from the surface to which the flexible membrane is bonded.

39. A folded card for use in an electronic reader, the folded card comprising a one piece member having at least two pages that can be folded between an open and a closed position, the folded card being insertable into the electronic reader when in the closed position, the folded card including a recording medium, suitable for storing encoded data, on an exterior face of one of the pages and printed matter on at least one other page, said at least one other page comprising a printing substrate, the two pages being joined by a living hinge comprising a section having a thickness less than the thickness of the remainder of the folded card so that the living is sufficiently flexible to allow the card to be folded.

* * * * *